(12) United States Patent
Nickerson et al.

(10) Patent No.: US 7,302,370 B2
(45) Date of Patent: Nov. 27, 2007

(54) SYSTEM AND METHOD FOR MANAGING BROWSER SESSIONS IN SINGLE AND MULTI-SERVER WORKFLOW ENVIRONMENTS

(75) Inventors: Thomas W. Nickerson, Belmont, CA (US); Martin P. Plotkin, Concord, MA (US)

(73) Assignee: Oracle International Corporation, Redwood Shores, CA (US)

( * ) Notice: Subject to any disclaimer, the term of this patent is extended or adjusted under 35 U.S.C. 154(b) by 594 days.

(21) Appl. No.: 10/714,738

(22) Filed: Nov. 17, 2003

(65) Prior Publication Data

US 2005/0108390 A1   May 19, 2005

(51) Int. Cl.
G06F 9/455 (2006.01)
(52) U.S. Cl. .......................... 703/6; 711/126; 713/201; 713/154; 709/229; 709/224; 709/220; 709/228
(58) Field of Classification Search ............... 703/6; 711/126; 715/501.1, 517; 725/112; 709/220, 709/228; 719/320; 713/154; 702/3; 345/763; 463/42; 340/539.13
See application file for complete search history.

(56) References Cited

U.S. PATENT DOCUMENTS

| | | | |
|---|---|---|---|
| 5,727,164 A | 3/1998 | Kaye et al. | |
| 5,870,544 A | 2/1999 | Curtis | |
| 5,873,069 A | 2/1999 | Reuhl et al. | |
| 5,894,554 A | 4/1999 | Lowery et al. | |
| 5,945,989 A | 8/1999 | Freishtat et al. | |
| 6,105,004 A | 8/2000 | Halperin et al. | |
| 6,226,642 B1 | 5/2001 | Beranek et al. | |
| 6,263,352 B1 | 7/2001 | Cohen | |
| 6,266,684 B1 | 7/2001 | Kraus et al. | |
| 6,308,275 B1 | 10/2001 | Vaswani et al. | |
| 6,415,319 B1 | 7/2002 | Ambroziak | |
| 6,434,578 B1 | 8/2002 | McCauley et al. | |
| 6,438,578 B1 | 8/2002 | Schmid et al. | |
| 6,457,030 B1 | 9/2002 | Adams et al. | |
| 6,493,679 B1 | 12/2002 | Rappaport et al. | |
| 6,535,896 B2 | 3/2003 | Britton et al. | |
| 6,594,691 B1 | 7/2003 | McCollum et al. | |
| 6,601,057 B1 | 7/2003 | Underwood et al. | |
| 6,626,958 B1 | 9/2003 | McCauley et al. | |
| 6,668,354 B1 | 12/2003 | Chen et al. | |
| 2002/0073211 A1* | 6/2002 | Lin et al. ................ | 709/229 |
| 2002/0165954 A1* | 11/2002 | Eshghi et al. ............. | 709/224 |
| 2003/0041263 A1* | 2/2003 | Devine et al. ............ | 713/201 |
| 2003/0164855 A1* | 9/2003 | Grant et al. .............. | 345/763 |
| 2003/0182402 A1* | 9/2003 | Goodman et al. ........ | 709/220 |

(Continued)

OTHER PUBLICATIONS

Yin et al., "Enhancing web cache consistentcy", ACM 2002.*

(Continued)

*Primary Examiner*—Kandasamy Thangavelu
(74) *Attorney, Agent, or Firm*—Chapin IP Law, LLC; Barry W. Chapin, Esq.

(57) ABSTRACT

Systems and methods are presented for managing browser sessions in single and multi-server workflow environments. Aspects involve maintaining session state for browser sessions at a first application server process, while communicating with a second application server process. Other aspects involve monitoring user activity and server state from a browser that can initiate responsive actions in response to error conditions.

19 Claims, 12 Drawing Sheets

U.S. PATENT DOCUMENTS

| | | | | |
|---|---|---|---|---|
| 2003/0221068 | A1* | 11/2003 | Tsuji et al. | 711/126 |
| 2004/0003351 | A1* | 1/2004 | Sommerer et al. | 715/517 |
| 2004/0031058 | A1* | 2/2004 | Reisman | 725/112 |
| 2004/0103199 | A1* | 5/2004 | Chao et al. | 709/228 |
| 2004/0117804 | A1* | 6/2004 | Scahill et al. | 719/320 |
| 2004/0162675 | A1* | 8/2004 | Moon et al. | 702/3 |
| 2004/0205514 | A1* | 10/2004 | Sommerer et al. | 715/501.1 |
| 2005/0040944 | A1* | 2/2005 | Contestabile | 340/539.13 |
| 2005/0054445 | A1* | 3/2005 | Gatto et al. | 463/42 |
| 2005/0060535 | A1* | 3/2005 | Bartas | 713/154 |

OTHER PUBLICATIONS

Mao et al., "Cluster-bsed online monitoring system of web traffic", ACM 2001.*

Yu et al., "A scalable web cache consistency architecture", ACM 1999.*

Rees et al., "Consistency management for distributed collaboration", ACM 1999.*

Ross et al., "A composable framework for secure multi-modal access to internet services from post-pc devices", ACM 2002.*

Fu et. al., "Reorganizing web sites based on user access patterns", ACM 2001.*

Arasu et al., "Searching the web", ACM 2001.*

Executing Server Script Remotely [online], 2004 [retrieved on Apr. 7, 2004]. Retrieved from the Internet http://msdn.microsoft.com/library/en-us/rmscpt/html/rmscptl.asp?frame=true.

Enabling Remote Scripting in Client Pages [online], 2004 [retrieved on Apr. 7, 2004]. Retrieved from the Internet http://msdn.microsoft.com/library/en-us/rmscpt/html/rmscpt2.asp?frame=true.

Enabling Remote Scripting in Server Pages [online], 2004 [retrieved on Apr. 7, 2004]. Retrieved from the Internet http://msdn.microsoft.com/library/en-us/rmscpt/html/rmscpt3.asp?frame=true.

* cited by examiner

SYSTEM AND METHOD FOR MANAGING BROWSER SESSIONS IN SINGLE AND MULTI-SERVER WORKFLOW ENVIRONMENTS

BACKGROUND

Networks, such as the Internet, provide infrastructure for a variety of online services. For example, vendors may set up Internet application servers to conduct business transactions. These application servers may include individual workflow processes for conducting these transactions, such as online processing of order entry, purchases, and/or delivery of goods or services. Alternatively, such workflow processes may be distributed across multiple application servers at different URL locations.

In multi-server workflow environments, a client browser establishes a browser session with an originating application server process, resulting in initialization of a session state. The session state may include communication resources that are allocated for the browser session or any application-specific information, such as user profile and account information.

During the browser session, the client browser may be redirected to a secondary application server process to perform a particular workflow task, such as order entry. After completion of the task, the client browser is redirected back to the originating server process for further workflow processing.

SUMMARY

Particular embodiments of the present invention are directed at systems and methods for managing browser sessions in single and multi-server workflow environments. Aspects involve maintaining session state for browser sessions at a first application server process, while communicating with a second application server process. Other aspects involve monitoring user activity and server state from a browser that can initiate responsive actions in response to error conditions.

Embodiments of the invention can include receiving a request for a web page from a client that has a browser session established at another server and providing a web page including a heartbeat page element that transmits heartbeat messages to the other server to maintain a state of the browser session. For example, the state of the browser session can include communication resources that are allocated for a browser session or any application specific information. The transmission of heartbeat messages can prevent the server maintaining the session state from terminating the browser session and losing the session state, while the client communicates with a secondary server.

Embodiments can further include providing a monitor in the web page that detects whether the other server is available from responses to the heartbeat messages.

Embodiments can further include accessing data from the state of the browser session being maintained at the other server by transmission of the heartbeat messages.

Embodiments can further include providing a proxy page element in the web page; receiving a request for a partial page update from the proxy page element in response to an event triggered in the web page; and communicating modification instructions to the proxy page element for the partial page update to page content in the web page where the modification instructions affect less than the entire page content in the web page.

Embodiments can include providing a page identifier and a monitor in the web page that detects user inactivity if the page identifier included in the web page is unchanged for a predetermined time.

Embodiments can include providing a state indicator and a monitor in the web page that detects server unavailability if the state indicator is invalid for a predetermined time.

In one particular embodiment, a first server and a second server provide individual processes of a common workflow. The first server establishes a browser session with a client, resulting in generation of a session state at the first server. The first server redirects the client from the browser session at the first server to a web page at the second server. The second server receives a request for a web page from the client, and then communicates the web page to the client where the web page includes a heartbeat page element. The first server, in turn, receives heartbeat messages from the heartbeat page element, resulting in maintenance of the session state at the first server while the client communicates with the second server.

BRIEF DESCRIPTION OF THE DRAWINGS

The foregoing and other objects, features and advantages of the system and method for managing browser sessions in single and multi-server workflow environments will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
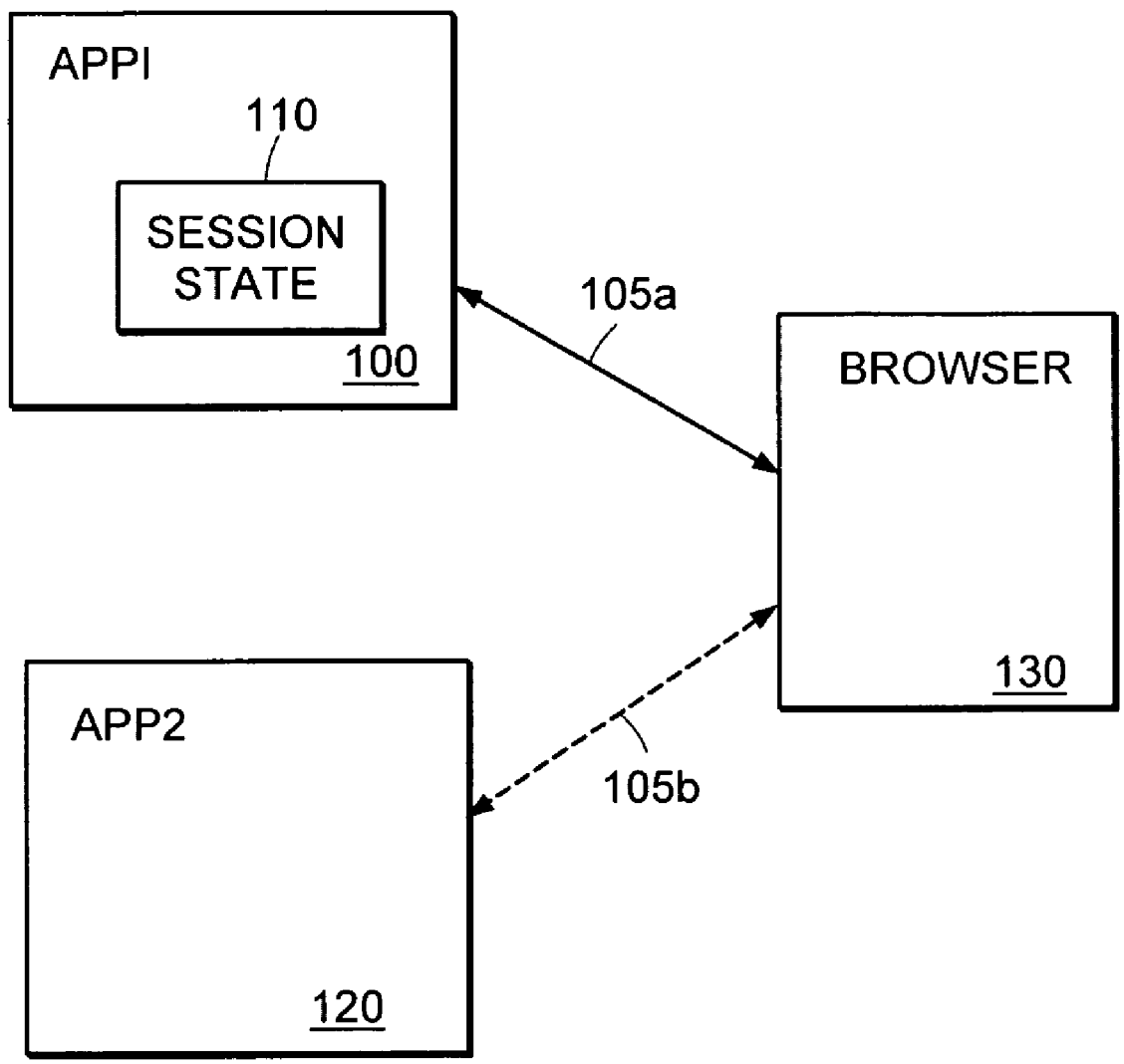
FIG. 1 is a block diagram illustrating a prior art multi-server workflow environment.

FIG. 1 is a block diagram illustrating a prior art multi-server workflow environment. A client browser 130 establishes a browser session with an originating application server process 100 over a link 105a. During establishment of the browser session, a session state 110 is initialized. The session state 110 may include communication resources that are allocated for the browser session or any application-specific information. For example, during a business transaction, the application-specific information may include user profile and account information.

During the browser session, the client browser 130 may be redirected over the link 105b to a secondary application server process 120 to perform a particular workflow task, for example, order entry. After completion of the task, the client browser 130 is redirected back to the originating server process 100 for further workflow processing, for example, purchase and delivery of the ordered goods or services.

Managing browser sessions in a multi-server workflow environment can be a complex task. One reason for its complexity involves maintenance of the session state at an originating server process, while the browser is communicating with a secondary server process. In multi-server workflow environments, a browser session is established between an originating server process and a client browser, resulting in a session state. The session state is maintained for the duration of the browser session or until the session becomes inactive. After the originating server process redirects the browser to a secondary server process, the client browser is no longer communicating with the originating server process.

Typically, server processes maintain inactivity timeouts to prevent inactive browser sessions from wasting server resources. If the secondary processing period exceeds the inactivity timeout on the originating server process, the browser session is terminated on the originating server process with the corresponding server resources for the session state being freed for reallocation to other sessions. Thus, when the client browser is redirected back to the server process, the session state is unavailable for further processing. Other reasons for its complexity, which are not unique to multi-server environments, include error detection and handling due to user inactivity and server unavailability.

Particular embodiments of the present invention are directed at systems and methods for managing browser sessions in single and multi-server workflow environments. Aspects involve maintaining session state for browser sessions at a first application server process, while communicating with a second application server process. Other aspects involve monitoring user activity and server state from a browser that can initiate responsive actions in response to error conditions. Multi-server workflow environments, such as in FIG. 1, and single-server workflow environments can be suitable for practicing embodiments of the invention.

Figure 2A:
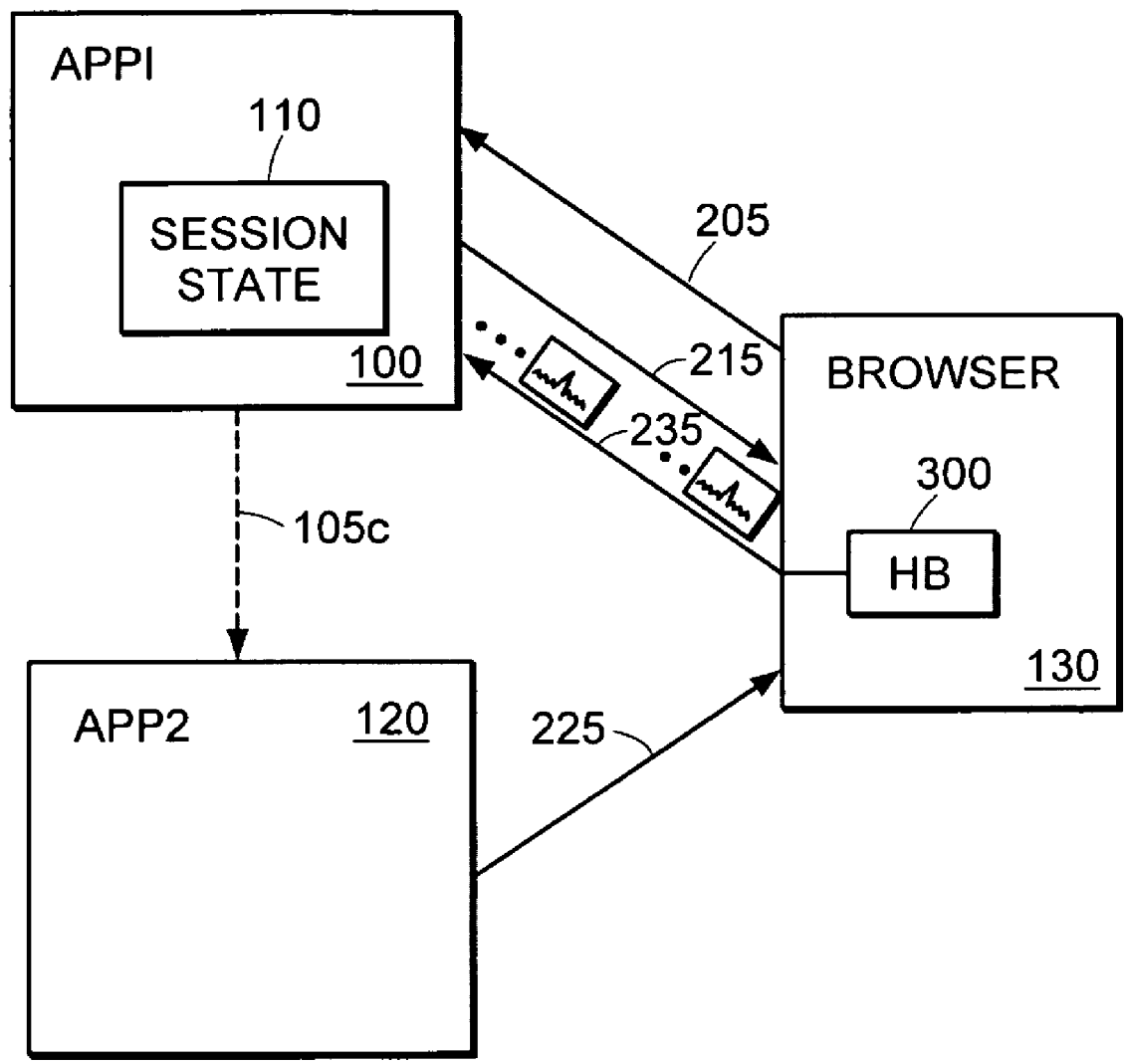
FIG. 2A is a block diagram illustrating a system for maintaining the session state for a browser session in a multi-server workflow environment.
Figure 2B:
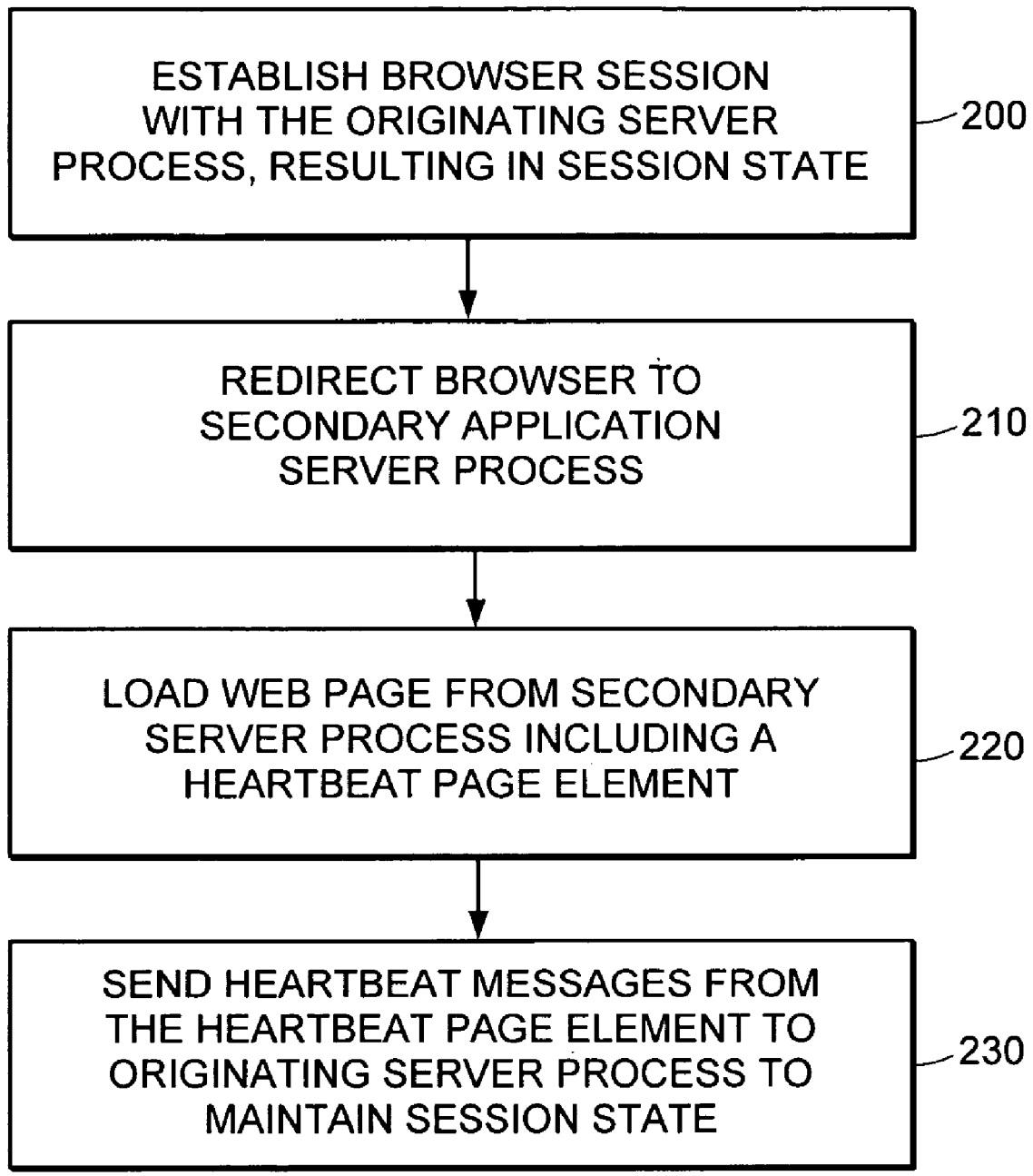
FIG. 2B is a flow chart of a particular method for maintaining the session state for a browser session in a multi-server workflow environment.

FIGS. 2A and 2B illustrate a particular system and method for managing browser sessions in a multi-server workflow environment. In particular, FIG. 2A is a block diagram illustrating a system for maintaining the session state for a browser session in a multi-server workflow environment. In the illustrated embodiment, a client browser 130 communicates with an originating application server process 100 and a secondary application server process 120 that both perform individual application-specific workflow tasks. The server processes 100, 120 may execute on a single application server in, for example, separate JAVA virtual machines. Alternatively, the server processes 100, 120 may execute individually on separate application servers. Both arrangements can correspond to a multi-server workflow environment.

FIG. 2B is a flow chart of a particular method for maintaining the session state for a browser session in a multi-server workflow environment.

At 200, the browser 130 establishes a browser session with the originating server process 100 through communications 205 in FIG. 2A, resulting in generation of a session state 110. The session state 110 may include communication resources that are allocated for a browser session and/or any application-specific information. The session state 110 may be updated during the browser session as needed.

At 210, the originating server process 100 redirects the client browser 130 to the secondary application server process 120 through communications 215 in FIG. 2A to perform a particular task in the workflow process.

At 220, the browser 130 loads a web page from the secondary server process 120 including a heartbeat page element 300 through communications 225 in FIG. 2A.

At 230, heartbeat messages 235 in FIG. 2A are transmitted from the heartbeat page element 300 to the originating server process 100 in order to maintain session state 110 on the originating server process 100. In particular, the transmission of the heartbeat messages 235 prevent the originating server process 100 from terminating the browser session due to inactivity, while the browser 130 communicates with the secondary server process 120.

Furthermore, because the session state 110 is maintained during workflow processing at the secondary server 120, the session state 110 may optionally serve as a data resource from which the secondary server process 120 may receive session state data over link 105c using server side data query techniques known to those skilled in the art.

Figure 3A:
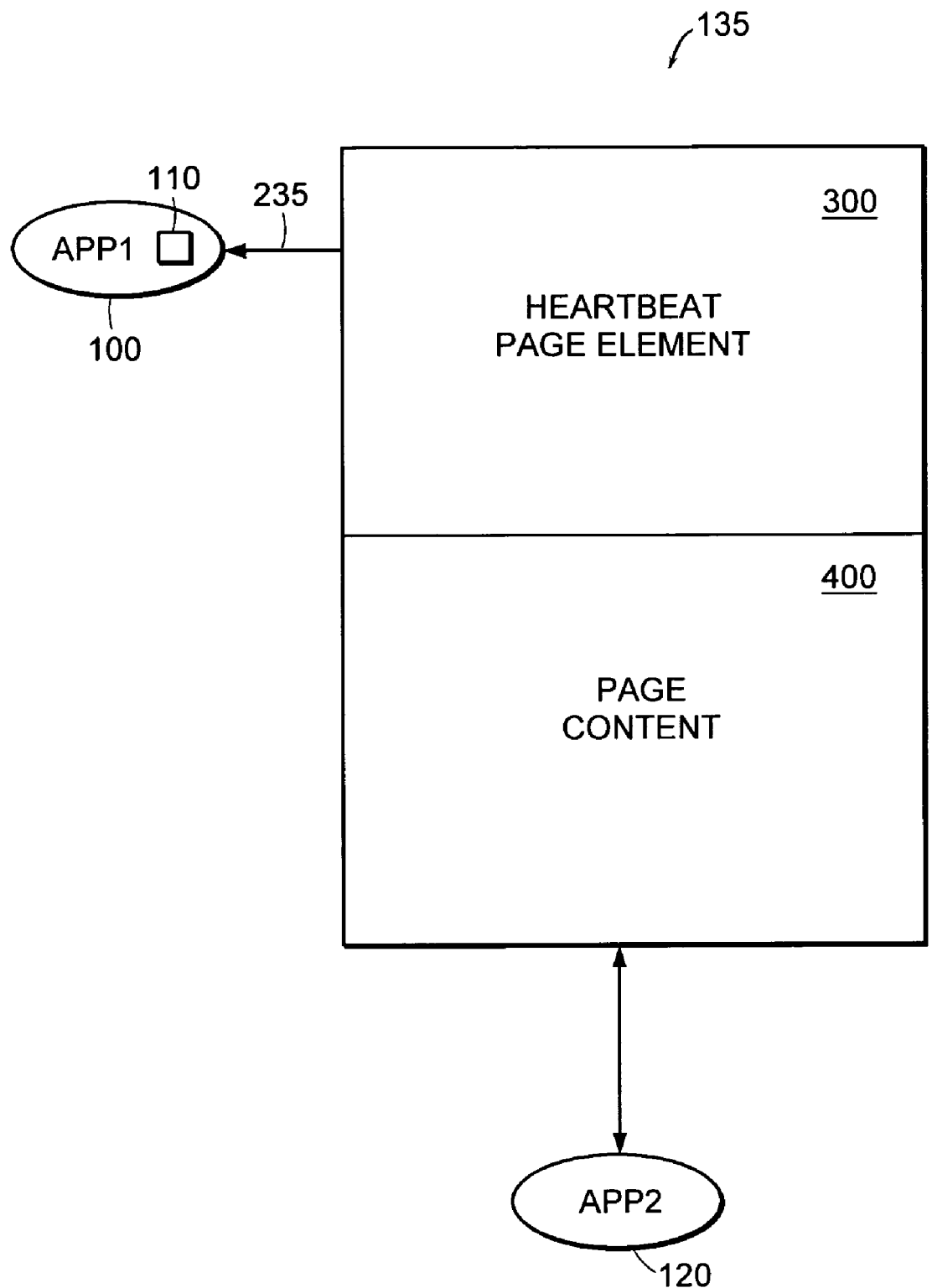
FIG. 3A is a block diagram illustrating a heartbeat page element in a web page according to one embodiment.

Referring to heartbeat messaging, FIG. 3A is a block diagram illustrating a heartbeat page element in a web page according to one embodiment. In the illustrated embodiment, a web page 135 loaded from the secondary server process 120 includes a heartbeat page element 300 and a page content 400. The heartbeat page element may include instructions for transmitting a heartbeat message to the originating application server 100. Heartbeat messages 235 are sent from the heartbeat page element 300 before the inactivity timeout expires at the originating application server process 100. However, the heartbeat messages are not required to be sent at synchronous time intervals.

For example, the heartbeat page element 300 can be a Frame element as described in HTML 4.0 and greater. A Frame element is a construct for presenting documents in multiple views, which may be independent windows or subwindows. For more information regarding the Frame element, refer to "16 Frames," HTML 4.01 Specification, W3C Recommendation, 24 Dec. 1999, the entire contents of which are incorporated herein by reference.

In another embodiment, the heartbeat page element 300 can implemented as an inline frame ("IFrame") element as described in HTML 4.0 and greater. An IFrame element is a construct for embedding a subdocument into a web page. For more information regarding the IFrame element, refer to "16.5 Inline Frames: the IFRAME element," HTML 4.01 Specification, W3C Recommendation, 24 Dec. 1999, the entire contents of which are incorporated herein by reference.

In still another embodiment, the heartbeat page element 300 can be implemented as a Layer element, which are supported in NETSCAPE NAVIGATOR versions 4.0 and greater. Similar to IFrame elements, Layer elements allow discrete layers of documents to be positioned in or outside the user interface of a browser process. For more information regarding Layer elements, refer to "Positioning Content," HTML Tag Reference, (NETSCAPE CORPORATION, Jan. 26, 1998), the entire contents of which are incorporated herein by reference.

According to one embodiment, the heartbeat page element 300 can be hidden from view so that the transmission of heartbeat messages is transparent to the user. For example, in JAVASCRIPT programming, a frame serving as a heartbeat page element 300 can be effectively hidden from view by setting the row height for that frame to zero.

Page content 400 can include any type of content, including audio, video and graphical content. Because the heartbeat page element 300 may be hidden from the user, the user can interact with the secondary application server process 120 unaware that heartbeat messages are being communicated to the originating server process 100. When the workflow task is completed at the secondary server process 120, the browser may be redirected back to the originating server process 100 with the session state 110 available for continued processing.

Figure 3B:
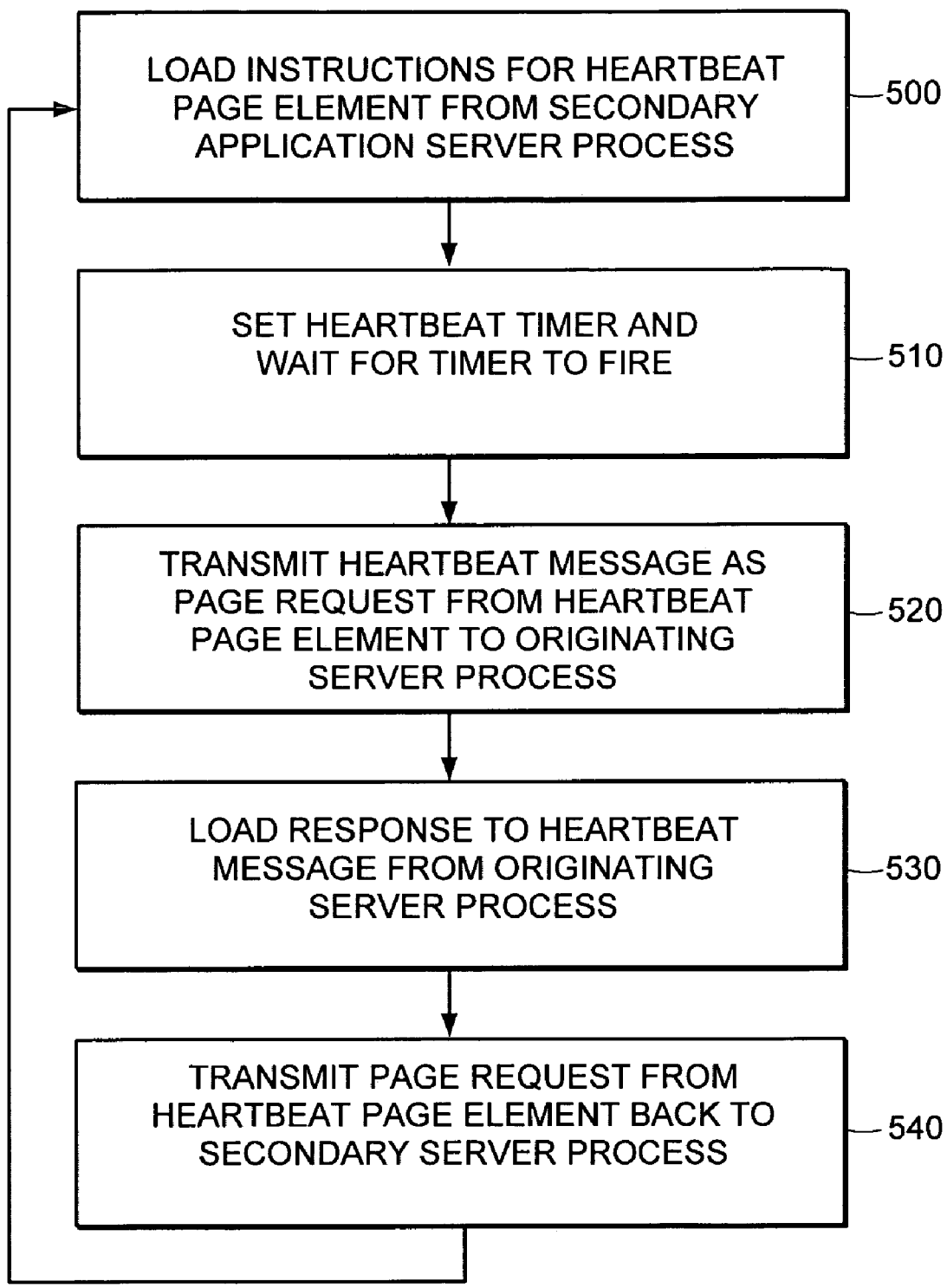
FIG. 3B is a flowchart of a particular method for sending heartbeat messages from a heartbeat page element to an originating server process in order to maintain session state.

FIG. 3B is a flowchart of a particular method for sending heartbeat messages from a heartbeat page element to an originating server process in order to maintain session state.

At 500, instructions from the secondary application server process 120 are loaded into the browser 130 for the heartbeat page element 300. The instructions define a time and manner for sending a heartbeat message to the originating server process 100.

At 510, the heartbeat page element 300 sets a heartbeat timer and waits for the timer to fire. The timer is configured to fire at least once before the inactivity timeout of the originating server process 100 expires. For example, the following JAVASCRIPT code segment sets the timer to fire after 10 seconds and to call function SendHeartbeat( ) in response:

setInterval("SendHeartbeat( )", 10000)

At 520, a heartbeat message is transmitted to the originating server process 100 as a page request in response to the heartbeat timer firing. For example, the source of the heartbeat page element 300 may be changed from the secondary server process to a location at the originating application server process 100, resulting in transmission of the page request (e.g., HTML request). The location of the heartbeat page element may be specified by a Universal Resource Locator (URL). The following JAVASCRIPT code segment, for example, causes a page request serving as a heartbeat to be transmitted back to an originating server process:

```
function SendHeartbeat( ) {
    RandomOne = Math.random( );
    qString = "?" + "UniqueValue=" +RandomOne;
    window.document.location = http://[ORGINATING
URL]/heartbeat.html
        + qString;
}
```

The variable "qString" forces the browser to transmit the page request to the originating server process even if page caching is turned on. For more information regarding displaying dynamic page content in a page-caching browser, refer to U.S. patent application Ser. No. 09/871,444 filed May 31, 2001, the entire contents of which are incorporated herein by reference.

At 530, a response to the heartbeat message is loaded into heartbeat page element 300 (e.g., heartbeat.html). For example, the response may include instructions for directing the source of the heartbeat page element 300 back to the secondary server process 120.

At 540, a page request from the heartbeat page element 300 is transmitted back to the secondary server process 120. For example, the source of the heartbeat page element 300 may be changed back to a location at the secondary application server process 120, resulting in the page request. The process then returns to 500 to load instructions from the secondary server process 120, initiating initiate transmission of another heartbeat message. For example, in the code segment in the JAVASCRIPT programming language can be as follows:

```
<body onLoad = Redirect( )>
function Redirect( ) {
{
    RandomOne = Math.random;
    qString = "?" + "UniqueValue=" + RandomOne;
    window.document.location = http://[SECONDARYURL]/
        heartbeat.html + qString;
}
``` where the heartbeat.html from the secondary server process includes instructions as in 510 and 520 to send the next heartbeat message.

By providing instructions that cause the heartbeat page element to redirect itself from the secondary server process 120 to the originating server process, JAVASCRIPT-enabled browsers do not respond with a JAVASCRIPT security error. Typically, JAVASCRIPT security errors occur when a JAVASCRIPT method attempts to redirect a portion of a web page, such as Frame, to a different server process (e.g., different web site servers). By having the heartbeat page element redirect itself, no JAVASCRIPT security errors occur when the source of the heartbeat page element 300 is changed to a different server process.

Figure 4A:
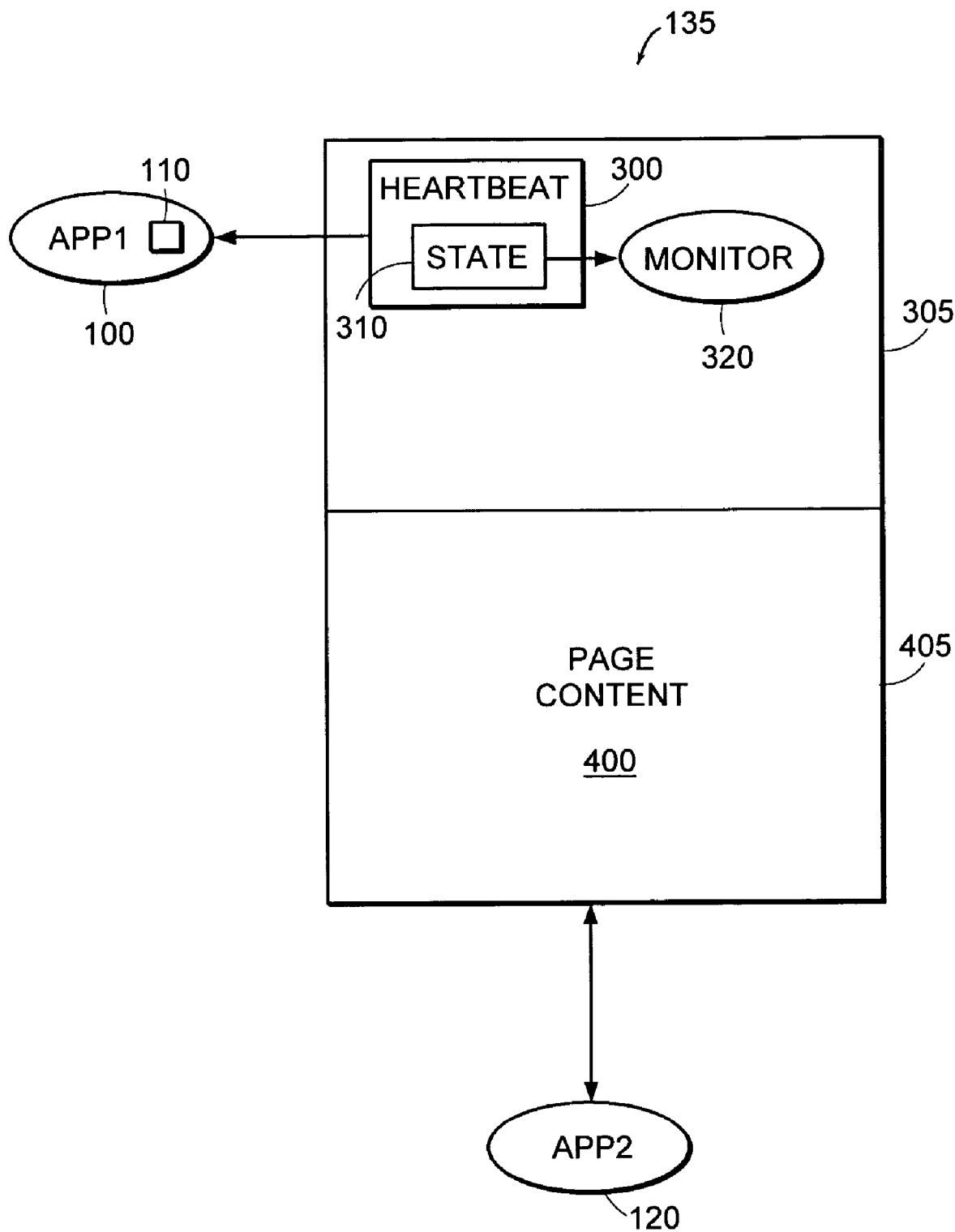
FIG. 4A is a block diagram illustrating a monitor within a web page for detecting the state of an originating application server process.
Figure 4B:
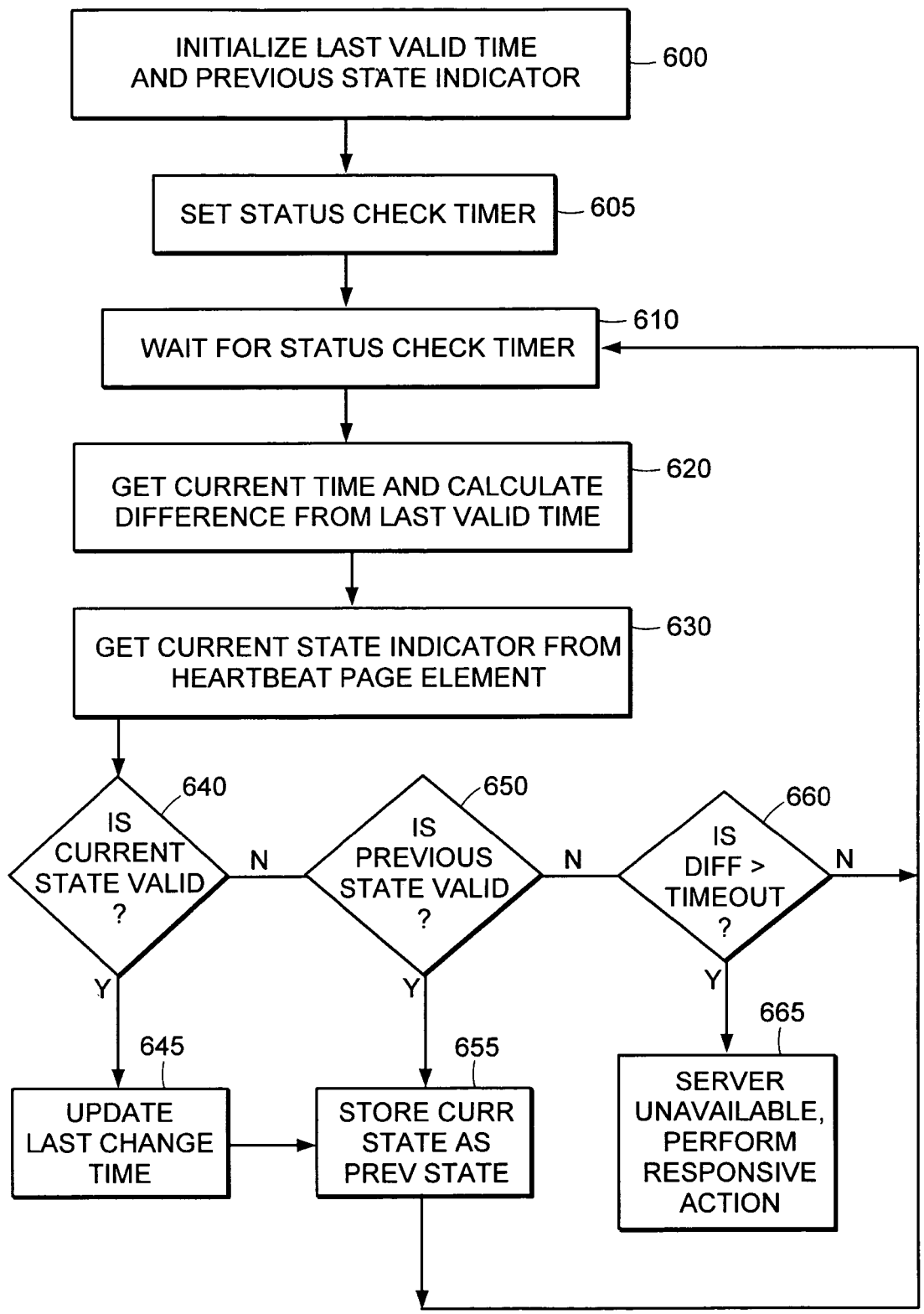
FIG. 4B is a flowchart of a particular method for monitoring the state of an originating application server process.

Because the originating server may become unavailable during workflow processing, particular embodiments of the invention provide a system and method for detecting and responding to the unavailability of an originating server process as illustrated in FIGS. 4A and 4B.

FIGS. 4A and 4B illustrate another particular system and method for managing browser sessions in a multi-server workflow environment. FIG. 4A is a block diagram illustrating a monitor within a web page for detecting the state of an originating application server process.

In the illustrated embodiment, web page 135 includes monitor 320 and heartbeat page element 300 in a container object 305 and page content 400 in another container object 405. Container objects 305, 405 allow the monitor 320 and heartbeat page element 300 to operate regardless of changes to page content 400. For example, the container objects 305, 405 can be Frame elements.

Monitor 320 periodically checks the status of the originating server process 100 by referencing state indicator 310 defined in heartbeat page element 300. State indicator 310 may be defined as any object having a valid value that is provided by the originating server process 100. State indicator 310 may have a fixed or variable value. For example, state indicator 310 may be a page identifier. If the page identifier has a valid numeric value, the originating server process 100 is deemed available and active. If the page identifier has an invalid value (e.g., null) for a period that exceeds an application-specific timeout, the originating server process 100 is deemed unavailable and responsive action may be initiated from the browser.

FIG. 4B is a flowchart of a particular method for monitoring the state of an originating application server process. The illustrated method can be implemented in monitor 320.

At 600, variables storing a "last valid" time and a previous state indicator are initialized. In particular, the last valid time is the time at which the value of the state indicator 310 was valid. The last valid time may be initialized to the current time, and the previous state indicator may be initialized to a valid object value, for example.

At 605, a status check timer is set to an application-specific time interval.

At 610, the process waits for the status check timer to fire and then continues at 620 where the current time is obtained and a difference is calculated between the current time and the last valid time.

At 630, the value of state indicator 310 is obtained from heartbeat page element 300.

At 640, the value of state indicator 310 is tested for validity. If the value of state indicator 310 is not null and thus valid, the process continues at 645 to update the last valid time to the current time and then to 655 to store the value of state indicator 310 in the previous state indicator. The process then returns back to 610 to wait for the next status check. Conversely, if the value of state indicator 310 is null and thus not valid at 640, the process continues at 650.

At 650, if the previous state indicator was valid, the process continues at 655, where the null value of state indicator 310 is stored in the previous state indicator. The last valid time is not updated, and the process returns back to 610 to wait for the next status check time. Conversely, if the previous and current state indicators are both invalid, the process continues at 660.

At 660, a determination is made as to whether state indicator 310 for the heartbeat page element 300 has been invalid for a time period that exceeds an application-specific timeout. If the timeout has not expired, the process returns back to 610 to wait for the next status check. Conversely, if the timeout is exceeded, the process continues at 665.

At 665, the server is deemed unavailable and responsive actions may be performed. State indicator 310 may be null if a system failure occurs at the originating server or if an intervening communication failure prevents server process 100 from responding to the heartbeat messages. In those situations, the heartbeat page element 300 is typically redirected to a default error page indicating that the server was unavailable or unknown, resulting in no state indicator being defined in the heartbeat page element 300.

The responsive actions may include displaying alert messages through the browser 130 to notify the user of the unavailable state of the originating server process 100. Alternatively, error log messages may be sent to a third party server to alert responsible parties. Responsive action may also include more complex error handling in which corrective action may be involved. For example, the browser 130 may wait a predetermined amount of time in order for the originating server to reboot itself and then attempt to reestablish the browser session and the corresponding session state 110. Reestablishment of the session state 110 may include transferring either parameters or cookies containing data to restore the session state. Other responsive actions may also be performed according to the requirements of the application and system architecture.

Figure 5A:
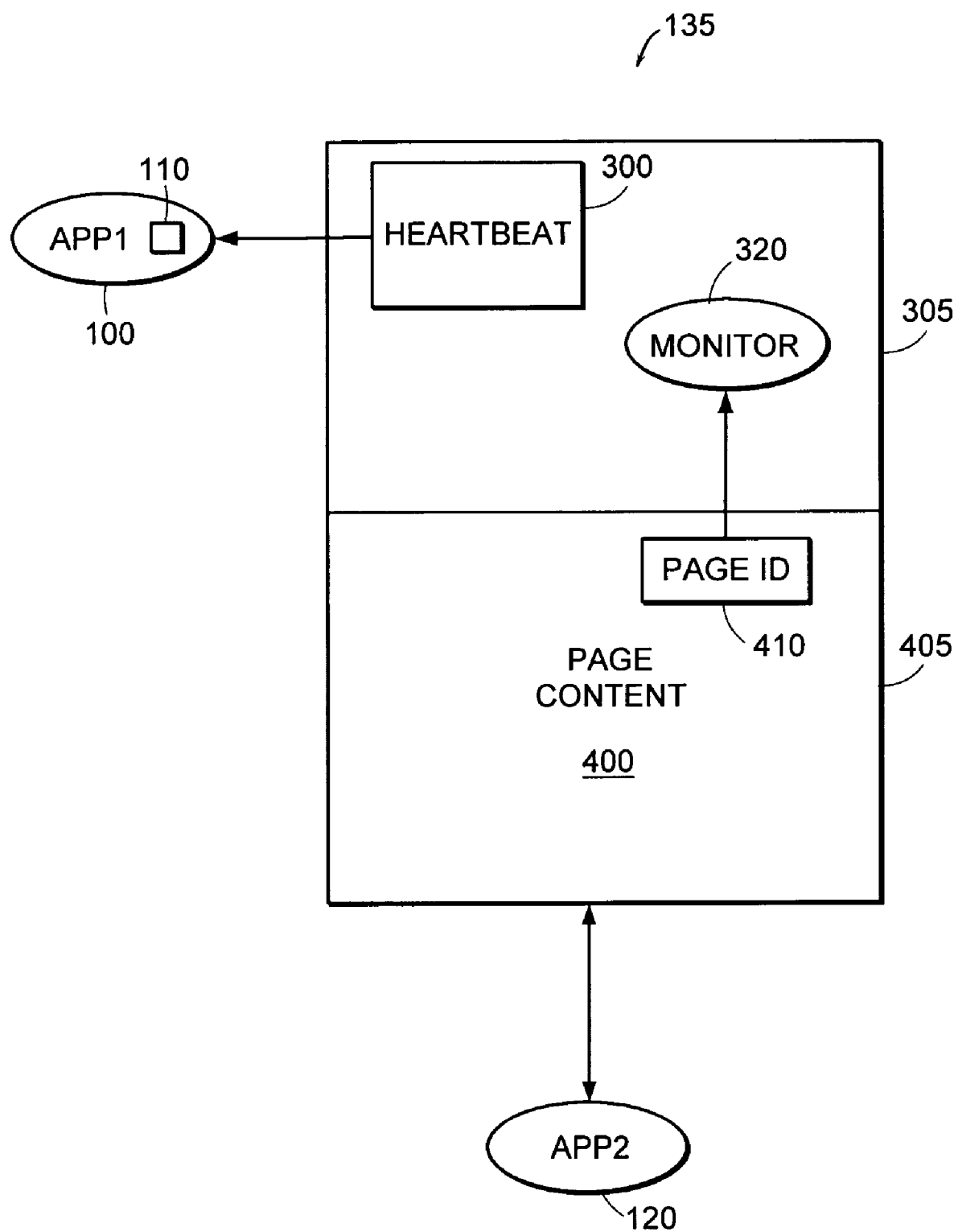
FIG. 5A is block diagram illustrating a monitor within a web page for detecting user inactivity.
Figure 5B:
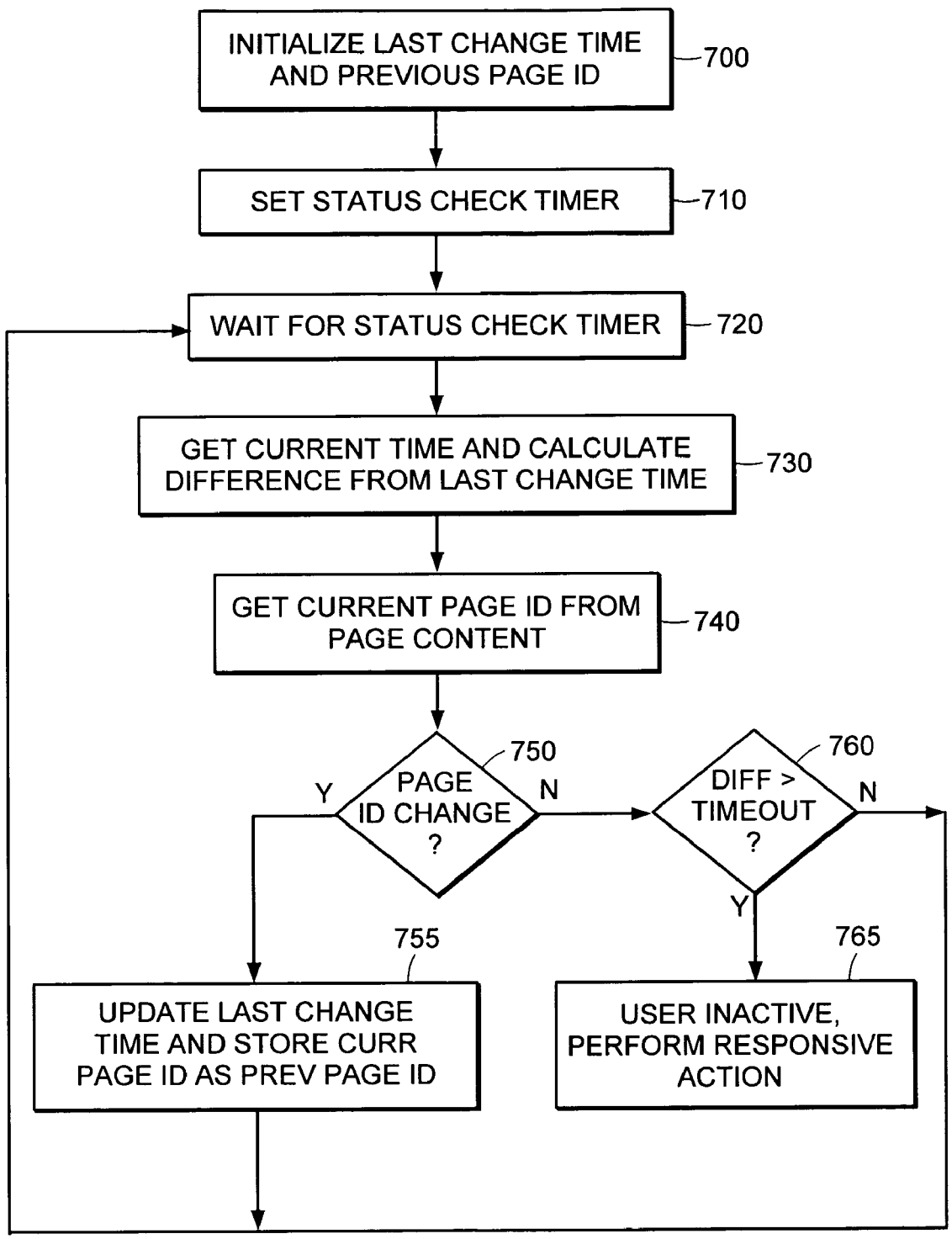
FIG. 5B is a flowchart of a particular method for detecting user inactivity from a browser.

Because a user may "walk away" from a browser session without attempting to properly end the session, particular embodiments of the invention provide a system and method for detecting and responding to such user inactivity as illustrated in FIGS. 5A and 5B.

FIGS. 5A and 5B illustrate another particular system and method for managing browser sessions in a multi-server workflow environment. FIG. 5A is a block diagram illustrating a monitor within a web page for detecting user inactivity. In the illustrated embodiment, the web page 135 includes monitor 320 and heartbeat page element 300 in a container object 305 and page content 400 in another container object 405. As in FIG. 5A, the container objects 305, 405 can be Frame elements.

Monitor 320 periodically checks the status of user activity by referencing page identifier 410 defined in page content 400. Page identifier 410 may be defined as any object having a value that changes with each update of page content 400. For example, page identifier 410 may be a counter or random variable that is updated by the secondary application server process 120 in response to each page request. If page identifier 410 changes before an application-specific timeout expires, the user is deemed active. Otherwise, the user is deemed inactive and responsive action may be initiated from the browser.

FIG. 5B is a flowchart of a particular method for detecting user inactivity from a browser. The illustrated method can be implemented by monitor 320.

At 700, variables storing a "last change" time and a previous page identifier are initialized. In particular the last change time is a status check time at which the value of page identifier 410 changed. The last change time may be initialized to a current time, and the previous page identifier may be initialized to zero, for example.

At 710, a status check timer is set to an application-specific time interval.

At 720, the process waits for the status check timer to fire and then continues at 730 where the current time is obtained and a difference is calculated between the current time and the last change time.

At 740, the value of page identifier 410 is obtained from page content 400.

At 750, the obtained value of page identifier 410 is compared with the previous page identifier to determine if the page content has changed. If the page identifier 410 has changed, the user is deemed active and the process continues at 755 to update the last change time to the current time and to store the obtained value of page identifier 410 in the previous page identifier. The process then returns back to 720 to wait for the next status check. Conversely, if page identifier 410 has not changed, the process continues at 760.

At 760, a determination is made as to whether page identifier 410 for page content 400 has not changed for a time period that exceeds an application-specific timeout. In particular, the difference between the current time and the last change time is compared with the timeout. If the user inactivity timeout has not expired, the process returns back to 720 to wait for the next status check. Conversely, if inactivity has been exceeded, the process continues at 765.

At 765, the user is deemed inactive and responsive actions may be performed. Responsive actions may include the client browser 130 sending a message to the originating application server process 100 indicating that the user is inactive. The originating server process 100 may, in turn, save the current session state 110 for that browser session and then send an message back to the browser notifying the user that the session was terminated for user inactivity. Server process 100 may also provide a reference number to the user for reestablishing the terminated browser session. Other response actions may be performed according to the requirements of the application and system architecture.

Figure 6:
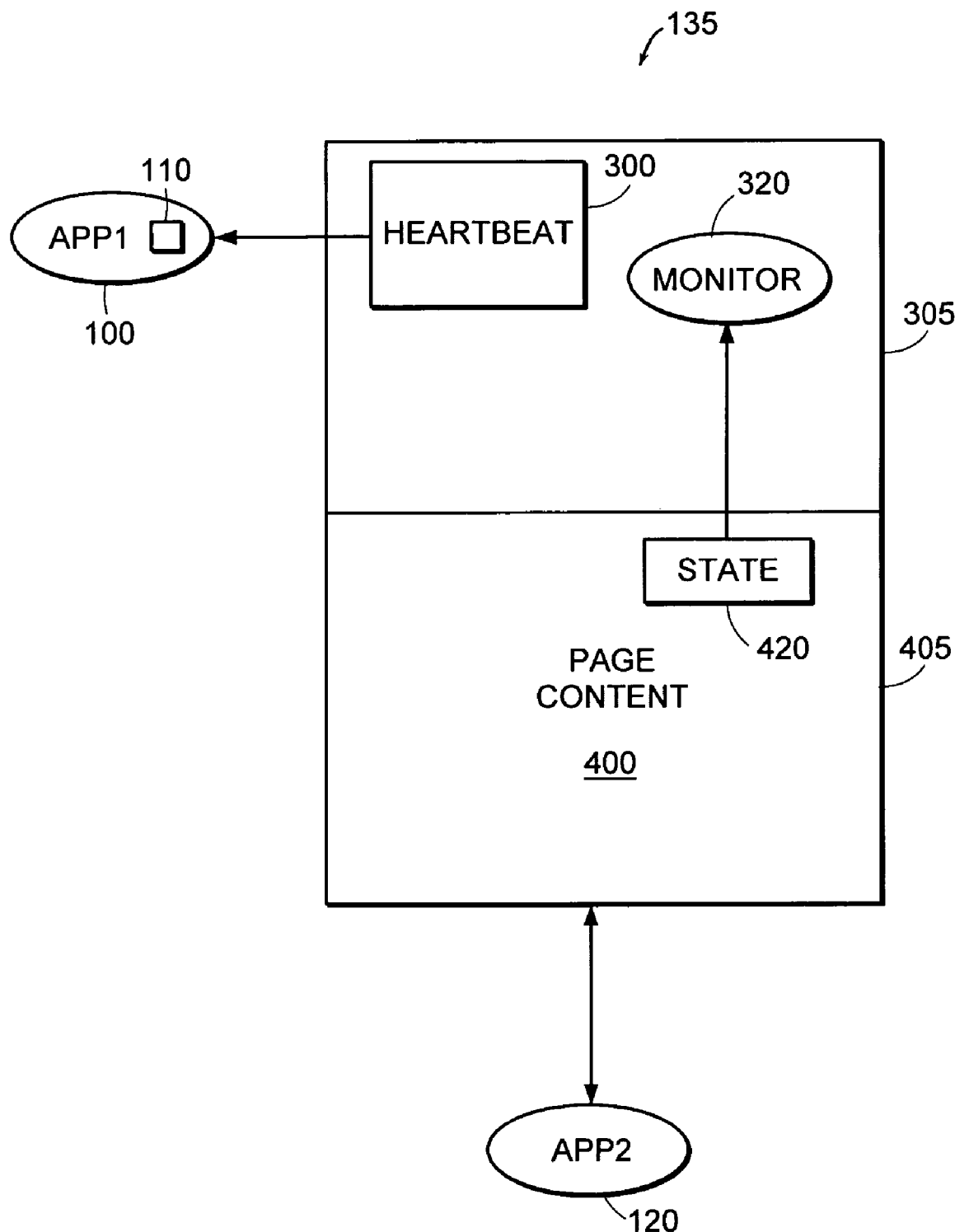
FIG. 6 is a block diagram illustrating a monitor within a web page for detecting the state of a secondary application server process.

Because the secondary server may also become unavailable during workflow processing, particular embodiments of the invention provide a system and method for detecting and responding to the unavailability of a secondary server process as illustrated in FIG. 6.

FIG. 6 is a block diagram illustrating a monitor within a web page for detecting the state of a secondary application server process. In the illustrated embodiment, the web page 135 includes a monitor 320 and a heartbeat page element 300 contained in a container object 305 and page content 400 contained in another container object 405. As in FIG. 4A, the container objects 305, 405 can be Frame elements.

Monitor 320 periodically checks the status of the secondary server process 120 by referencing state indicator 420 defined in page content 400. State indicator 420 may be defined as any object having a valid value provided by the secondary server process 120. The state indicator 420 may have a fixed or variable value. For example, state indicator 420 may be a page identifier. If the page identifier has a valid numeric value, the secondary server process 120 is deemed available and active. If the page identifier has an invalid value (e.g., null) for a period that exceeds an application-specific timeout, the originating server process 100 is deemed unavailable and responsive action may be initiated from the browser.

The process for detecting the state of the secondary application server process 120 according to one embodiment is similar to that described in FIG. 4B except that the value of state indicator 420 is obtained from page content 400 rather than the heartbeat page element 300.

Figure 7:
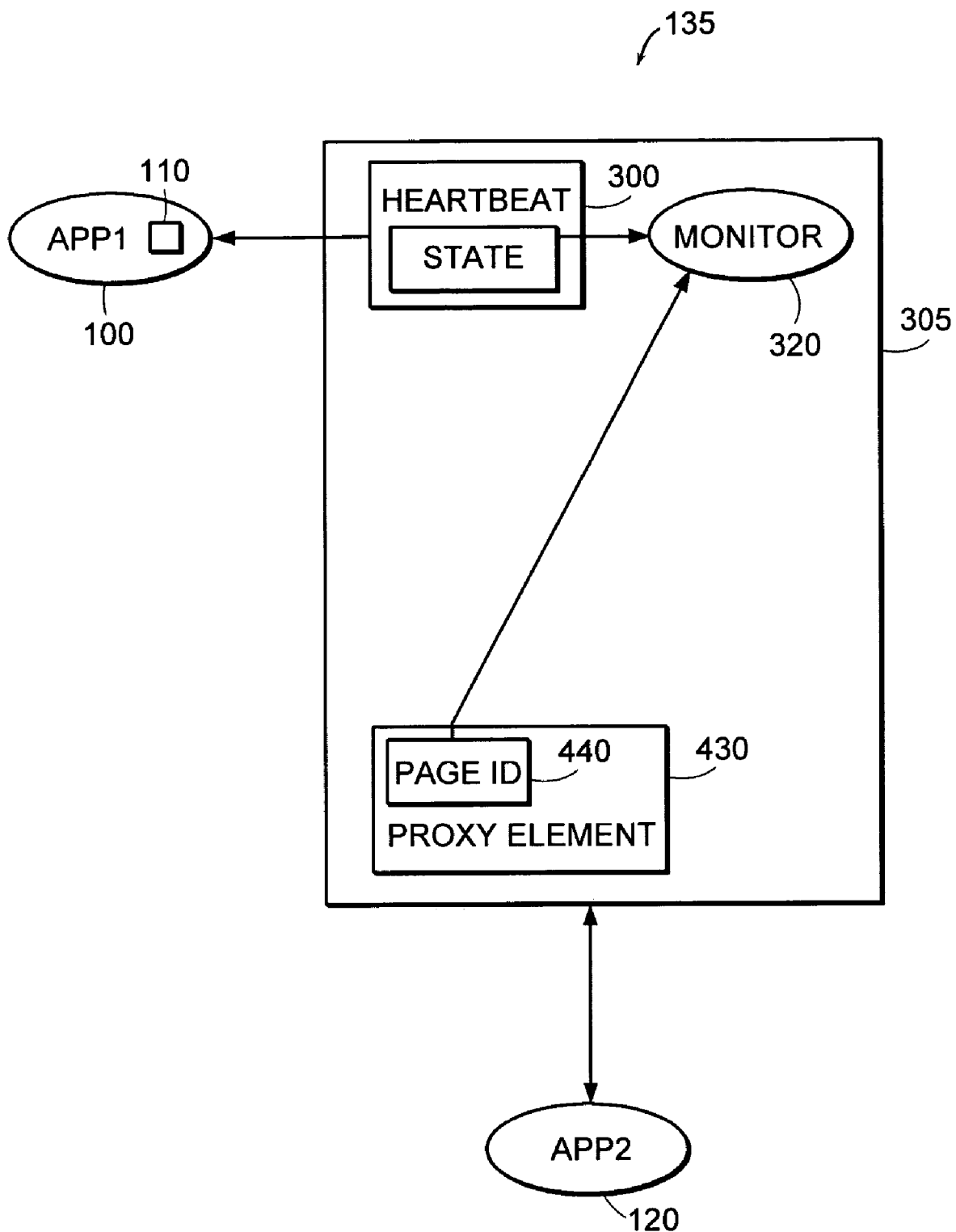
FIG. 7 is a block diagram illustrating a particular system for managing browser sessions and providing partial page updates in a multi-server workflow environment.

Because it is desirable to navigate from one web page to a next without having to reload the entire page each time, particular embodiments of the invention provide a system and method for communicating partial page updates between a client and server as illustrated in FIG. 7.

FIG. 7 is a block diagram illustrating a particular system for managing browser sessions and providing partial page updates in a multi-server workflow environment. In the illustrated embodiment, container objects are not required to contain the heartbeat page element 300, monitor 320, and page content 400. This arrangement is a result of web page 135 including a proxy page element 430 that provides for partial page updates of page content 400. Whenever a page event or other event occurs that requires an update to page content 400, the proxy element 430 communicates with the secondary server process 120 on behalf of page element 400 to request instructions for updating portions of page content 400. The secondary server process 120, in turn, provides instructions back to proxy element 430 for modifying portions of page content 400 without having to reload the entire web page 135. Thus, the proxy element 430 allows heartbeat page element 300 and monitor 320 to operate regardless of changes to page content 400.

For more information regarding proxy page elements and partial page updates, refer to U.S. application Ser. No. 09/570,276 filed May 12, 2000, entitled "Content Update Proxy Method," and U.S. application Ser. No. 10/246,661 filed Sep. 18, 2002, entitled "System And Method For Partial Page Updates Using A Proxy Element." The entire contents of the above-referenced U.S. patent applications are incorporated herein by reference.

In the illustrated embodiment of FIG. 7, monitoring of user activity and the state of server processes 100 may operate in the same manner as described in FIGS. 5B and 5B. However, with respect to monitoring of user activity and the state of secondary server process 120, it is preferable that proxy element 430 include a page identifier 440. In this embodiment, monitor 320 periodically checks user activity and the state of the secondary server process 120 by references page identifier 440.

With respect to monitoring the state of the secondary server process 120, server process 120 is deemed available and active if page identifier 440 has a valid numeric value. Otherwise, if the page identifier 440 is invalid for a period that exceeds an application specific timeout, the secondary server process 120 is deemed unavailable and responsive action may be initiated by the browser.

With respect to user activity detection, a user is deemed active if the value of page identifier 440 changes before the inactivity timeout is reached. Otherwise, the user is deemed inactive and responsive action may be initiated by the browser.

Figure 8:
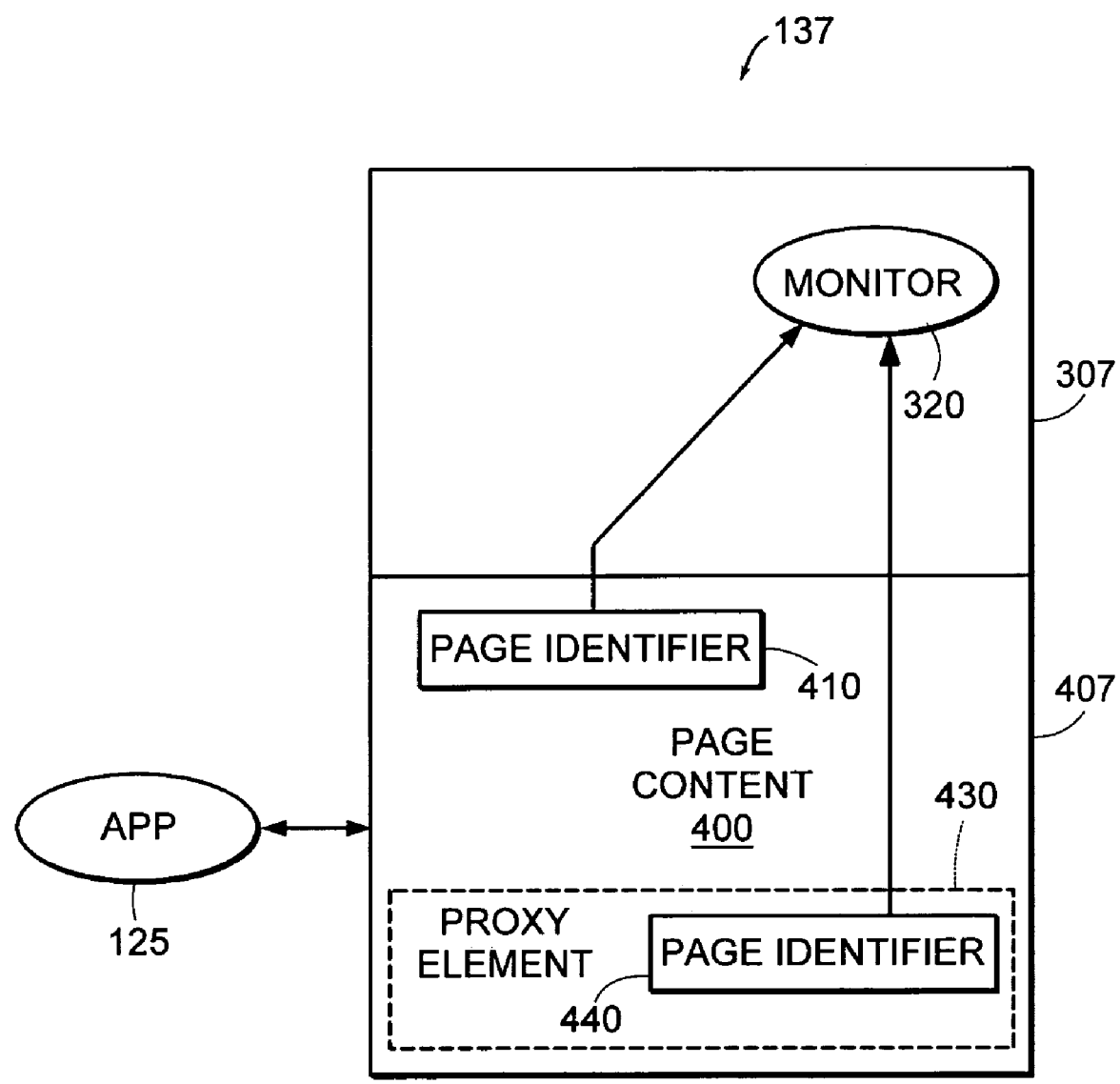
FIG. 8 is a block diagram illustrating a monitor within a web page for detecting user activity and the state of an application server process in a single-server workflow environment.

Because error detection and handling due to user inactivity and server unavailability is not unique to multi-server workflow environments, particular embodiments of the invention provide such capabilities for single-server workflow environments as illustrated in FIG. 8.

FIG. 8 is a block diagram illustrating a monitor within a web page for detecting user activity and the state of an application server process in a single-server workflow environment. According to the illustrated embodiment, web page 137 includes monitor 320 and page content 400 contained in individual container objects 307, 407. Container objects 307, 407 allow the monitor 320 to operate regardless of changes to page content 400. For example, the container objects 307, 407 may be Frame elements.

Monitor 320 detects user activity by referencing page identifier 410 as described in FIG. 5B. Monitor 320 may also detect the state of server process 125 as described in FIG. 4B except that page identifier 410 is obtained from page content 400 rather than the heartbeat page element 300 that is omitted in this embodiment.

According to another embodiment, a proxy page element 430 may be included in web page 137 to enable partial page updates. Since proxy page element 430 modifies page content 400 without having to reload web page 137 in its entirety, monitor 320 and page content 400 are not required to be contained in container objects 307, 407. Furthermore, monitor 320 may detect user activity and server state by referencing page identifier 440 defined in proxy element 430.

In any of the embodiments, responsive action may be initiated by the browser in the event that a user is deemed inactive or server process 125 is deemed unavailable.

Those of ordinary skill in the art realize that methods involved in managing browser sessions in multi-server and single-server workflow environments may be embodied in a computer program product that includes a computer-usable medium. For example, a computer usable medium can include a readable memory device, such as a hard drive device, a CD-ROM, a DVD-ROM, a computer diskette or solid-state memory components (ROM, RAM), having computer readable program code segments stored thereon.

While the system has been particularly shown and described with references to particular embodiments, it will be understood by those of ordinary skill in the art that various changes in form and details may be made without departing from the scope of the invention encompassed by the appended claims. For example, the methods of the invention can be applied to various environments, and are not limited to the described environment.

What is claimed is:

1. A method of managing browser sessions, comprising:
    establishing a browser session at a primary server process, resulting in generation of a session state, on receipt of a request for a web page from a client;
    directing the request from the browser session at the primary server process to a web page at a secondary server process;
    sending a web page from the secondary server process to the client wherein the web page includes a heartbeat page element that transmits heartbeat messages to the primary server process;
    maintaining, at the primary server process, the session state during communications between the client and the secondary server process; and
    displaying the web page on a client display device, while maintaining communication with the primary and secondary server processes.

2. The method of claim 1 further comprising:
    the secondary server process providing, to the client, a web page including a monitor,
    the monitor detecting whether the primary server process is available from responses to the heartbeat messages.

3. The method of claim 1 further comprising:
    providing, from the secondary server process to the client, a web page including a page identifier and a monitor,
    the client executing the monitor and checking the page identifier at regular intervals; and
    the monitor detecting user inactivity if the page identifier is unchanged for a predetermined time.

4. The method of claim 1 further comprising:
    providing, from the secondary server process to the client, a web page including a page identifier and page content having a state identifier and a monitor,
    the client executing the monitor and checking the state identifier at regular intervals; and
    the monitor detecting server unavailability if the state identifier is unchanged for a predetermined time.

5. The method of claim 1 further comprising:
    accessing data from the session state of the browser being maintained at the primary server process by transmission of the heartbeat messages.

6. The method of claim 1 further comprising:
    providing a proxy page element in the web page;
    receiving a request for a partial page update from the proxy page element in response to an event triggered in the web page;
    communicating modification instructions to the proxy page element for the partial page update to page content in the web page, the modification instructions affecting less than the entire page content in the web page.

7. The method of claim 1 wherein the heartbeat page element is a Frame element, an IFrame element, or a Layer element.

8. A method of managing browser sessions, comprising:
    establishing a browser session at a first server, resulting in generation of a session state at the first server, on receipt of a request for a web page from a client;
    redirecting from the browser session at the first server to a web page at a second server;
    receiving, at the client, the web page from the second server, the web page including a heartbeat page element;
    transmitting heartbeat messages from the heartbeat page element to the first server to maintain the session state at the first server while the client is continuing to communicate with the second server; and
    displaying the web page on a client display device, while maintaining communication with the first and second servers.

9. The method of managing browser sessions of claim 8, further comprising:
    the secondary server providing, to the client, a web page including a page identifier and a monitor,
    the client executing the monitor and checking the page identifier at regular intervals; and
    the monitor detecting user inactivity if the page identifier is unchanged for a predetermined time.

10. The method of managing browser sessions of claim 8, further comprising:
    the secondary server providing, to the client, a web page including a page identifier and page content having a state identifier and a monitor,
    the client executing the monitor and checking the state identifier at regular intervals; and
    the monitor detecting server unavailability if the state identifier is unchanged for a predetermined time.

11. A system of managing browser sessions, comprising:
    a first server and a second server providing individual processes of a common workflow;
    the first server receiving a request for a web page from a client;
    the first server establishing a browser session with the client, resulting in generation of a session state at the first server;
    the first server redirecting the client from the browser session at the first server to a web page at the second server;
    the second server receiving a request for a web page from the client;
    the second server communicating the web page to the client, the web page including a heartbeat page element;
    the client transmitting heartbeat messages from the heartbeat page element to the first server;
    the first server receiving heartbeat messages from the heartbeat page element, resulting in maintenance of the session state at the first server while the client communicates with the second server; and
    displaying the web page on a client display device, while maintaining communication with the first and second servers.

12. The system of managing browser sessions of claim 11, further comprising:
    the secondary server providing, to the client, a web page including a page identifier and a monitor,
    the client executing the monitor and checking the page identifier at regular intervals; and
    the monitor detecting user inactivity if the page identifier is unchanged for a predetermined time.

13. The system of managing browser sessions of claim 11, further comprising:
    the secondary server providing, to the client, a web page including a page identifier and page content having a state identifier and a monitor,
    the client executing the monitor and checking the state identifier at regular intervals; and
    the monitor detecting server unavailability if the state identifier is unchanged for a predetermined time.

14. An article of manufacture comprising a computer-readable storage medium including computer instructions therein which when executed on a computer perform a method of managing browser sessions, the method comprising:

establishing a browser session at a primary server process, resulting in generation of a session state, on receipt of a request for a web page from a client;

directing the request from the browser session at the primary server process to a web page at a secondary server process;

sending a web page from the secondary server process to the client wherein the web page includes a heartbeat page element that transmits heartbeat messages to the primary server process;

maintaining, at the primary server process, the session state during communications between the client and the secondary server process; and displaying the web page on a client display device, while maintaining communication with the primary and secondary server processes.

15. The article of manufacture comprising a computer-readable storage medium of claim 14, wherein the method further comprising:

the secondary server process providing, to the client, a web page including a page identifier and a monitor, the client executing the monitor and checking the page identifier at regular intervals; and the monitor detecting user inactivity if the page identifier is unchanged for a predetermined time.

16. An article of manufacture comprising a computer-readable storage medium of claim 14, wherein the method further comprising:

the secondary server process providing, to the client, a web page including a page identifier and page content having a state identifier and a monitor, the client executing the monitor and checking the state identifier at regular intervals; and the monitor detecting server unavailability if the state identifier is unchanged for a predetermined time.

17. An article of manufacture comprising a computer-readable storage medium including computer instructions therein which when executed on a computer perform a method of managing browser sessions, the method comprising:

establishing a browser session at a first server, resulting in generation of a session state at the first server, on receipt of a request for a web page from a client;

redirecting from the browser session at the first server to a web page at a second server;

receiving, at the client, the web page from the second server, the web page including a heartbeat page element;

transmitting heartbeat messages from the heartbeat page element to the first server to maintain the session state at the first server while the client is continuing to communicate with the second server; and displaying the web page on a client display device, while maintaining communication with the first and second servers.

18. The article of manufacture comprising a computer-readable storage medium of claim 17, wherein the method further comprising:

the secondary server providing, to the client, a web page including a page identifier and a monitor, the client executing the monitor and checking the page identifier at regular intervals; and the monitor detecting user inactivity if the page identifier is unchanged for a predetermined time.

19. An article of manufacture comprising a computer-readable storage medium of claim 17, wherein the method further comprising:

the secondary server providing, to the client, a web page including a page identifier and page content having a state identifier and a monitor, the client executing the monitor and checking the state identifier at regular intervals; and the monitor detecting server unavailability if the state identifier is unchanged for a predetermined time.

* * * * *

UNITED STATES PATENT AND TRADEMARK OFFICE
CERTIFICATE OF CORRECTION

| | | |
|---|---|---|
| PATENT NO. | : 7,302,370 B2 | Page 1 of 1 |
| APPLICATION NO. | : 10/714738 | |
| DATED | : November 27, 2007 | |
| INVENTOR(S) | : Nickerson et al. | |

It is certified that error appears in the above-identified patent and that said Letters Patent is hereby corrected as shown below:

On the Title page, in item (56), under "Other Publications", in column 2, line 1, delete "consistentcy"," and insert -- consistency", --, therefor.

On page 2, under "Other Publications", in column 1, line 1, delete "bsed" and insert -- based --, therefor.

On page 2, under "Other Publications", in column 2, line 10, delete "rmscptl.asp" and insert -- rmscpt1.asp --, therefor.

In column 10, line 3, delete "5B" and insert -- 5A --, therefor.

In column 11, line 48, in Claim 6, delete "providing" and insert -- providing, from the first server to the client, --, therefor.

In column 11, line 49, in Claim 6, delete "receiving" and insert -- receiving, at the first server from the proxy page element, --, therefor.

In column 11, lines 49-50, in Claim 6, after "update" delete "from the proxy page element".

In column 11, line 52, in Claim 6, after "instructions" insert -- from the first server --.

Signed and Sealed this

Eighth Day of June, 2010

David J. Kappos
*Director of the United States Patent and Trademark Office*